(12) United States Patent
Jahnke

(10) Patent No.: US 7,137,118 B2
(45) Date of Patent: Nov. 14, 2006

(54) DATA SYNCHRONIZATION HARDWARE PRIMITIVE IN AN EMBEDDED SYMMETRICAL MULTIPROCESSOR COMPUTER

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 780 days.

(21) Appl. No.: 10/256,920

(22) Filed: Sep. 27, 2002

(65) Prior Publication Data
US 2004/0064675 A1 Apr. 1, 2004

(51) Int. Cl.
G06F 9/46 (2006.01)

(52) U.S. Cl. .................. 718/102; 718/103; 711/147

(58) Field of Classification Search ............... 718/100, 718/102–104; 711/147, 150, 154–156
See application file for complete search history.

(56) References Cited

U.S. PATENT DOCUMENTS

| | | | |
|---|---|---|---|
| 4,847,757 A | * | 7/1989 | Smith .................... 710/114 |
| 5,740,404 A | * | 4/1998 | Baji ..................... 711/167 |
| 6,009,495 A | * | 12/1999 | DeRoo et al. .......... 711/103 |
| 6,014,729 A | * | 1/2000 | Lannan et al. ......... 711/150 |
| 6,954,873 B1 | * | 10/2005 | Jain ..................... 713/500 |

OTHER PUBLICATIONS

Altera, "System Design Using SOPC Builder" (Dec. 2004).*

* cited by examiner

Primary Examiner—Meng-Ai T. An
Assistant Examiner—Lilian Vo
(74) Attorney, Agent, or Firm—Robert D. Marshall, Jr.; W. James Brady; Frederick J. Telecky, Jr.

(57) ABSTRACT

An embedded symmetrical multiprocessor system includes arbitration logic that determines which central processing unit has access to shared memory. Upon grant of access, the memory address is stored in a memory address register. An address compare circuit compares the access address of any other central processing unit with this stored address. Upon a match, the arbitration logic stalls the second accessing central processing unit until expiration of a programmable number of wait states following the first access. These wait states give the first central processing unit enough time to determine the state of a lock variable and take control of an operation protected by the lock variable. The application boot code can determine how long the read-check-write operation requires and program that value into the wait-state generator.

16 Claims, 2 Drawing Sheets

DATA SYNCHRONIZATION HARDWARE PRIMITIVE IN AN EMBEDDED SYMMETRICAL MULTIPROCESSOR COMPUTER

TECHNICAL FIELD OF THE INVENTION

The technical field of this invention is data synchronization in an embedded symmetrical multiprocessor computer.

BACKGROUND OF THE INVENTION

Most multiprocessor systems have two or more processors that are not completely identical, but instead have a degree of individual special features and functions. The tighter coupling between the multiprocessors integrated on a single chip allows for a more efficient passing of data than for similar multiprocessors implemented at the board level. Each processor may have a different memory map, different peripheral set and perhaps even a different instruction set. In applications that have very distinct boundaries, such as a cell phone, this method of extracting optimum performance is crucial.

It is desirable to define an architecture that offers the modularity and flexibility that the multiprocessor system offers and reuse advantages of a single processor system, but also the lower development costs and scalability. The symmetric parallel processing system, upon which this invention is based, was developed for this reason.

One of the more formidable difficulties designers of any symmetric multiprocessing system (SMP) must deal with is the issue of data coherence. Since all central processing units have access to all system resources such as memory and peripherals, if one central processing unit changes a value in memory, it must not affect the operation of the other central processing units. As an example, if a shared variable exists in memory that is used as a lock variable with an active locked state signified by a logical '1', no other central processing unit can use the process associated with the lock until it is first set to logical '0' by the lock-grabbing central processing unit. For example, suppose central processing unit 101 reads the lock variable, checks the value and then proceeds to set the lock. However, central processing unit 103 also reads the lock before central processing unit 101 has completed setting the lock. Both central processing units proceed under the assumption that the lock is not set. They both proceed with the process that the lock is designed to safeguard against. This will cause program behavior that was not anticipated by the software engineer and can cause an application to perform differently than expected.

Many desktop central processing units avoid this unwanted occurrence by having this special lock-set/lock reset hardware primitive as part of the instruction set. For example, the base central processing unit used in the symmetrical multiprocessor system will have a special instruction or instruction pair that will check memory and set a lock flag bit if that location is not set. This atomic operation is not interruptible and it thereby insures that another central processing unit cannot read the same location before the first central processing unit has completed writing the set value back to memory. This approach is not available to the base central processing unit of an embedded multiprocessor if this instruction is not a part of the original instruction set.

SUMMARY OF THE INVENTION

In an embedded symmetrical multiprocessor system, there is a data memory arbiter within the arbitration logic that will determine which processor has access to memory. This invention describes the creation of a memory address compare circuit within this arbitration logic that will cause a central processing unit to stall for a programmable number of wait states if the same data location has been read by another processor. This will give the first processor sufficient time to determine the state of the variable and write to memory the intended value in an atomic fashion without allowing for interrupts. Other central processing units attempting to read the same data location will stall until the correct value has been written back to memory. Since the number of wait states is programmable, the application boot code can determine how long it will take to perform the read-check-write operation and store that value into the wait-state generator. The arbitration logic will not allow another central processing unit access to that memory location for the programmed number of wait states after being read by the first central processing unit.

BRIEF DESCRIPTION OF THE DRAWINGS

These and other aspects of this invention are illustrated in the drawings, in which.

DETAILED DESCRIPTION OF PREFERRED EMBODIMENTS

In order to support the various software techniques employed to maintain data integrity, a basic hardware primitive that allows an atomic read and modify of memory must be present. In a conventional desktop symmetrical multiprocessor system, this hardware primitive usually takes the form of a special instruction or instruction pair in the base processor that will perform an atomic read-modify of memory. Currently embedded processors do not support such special hardware primitives comprising a special instruction or instruction pairs directing uninterruptible memory read-modify operations in the base processor. The task of performing such operations in an embedded symmetrical multiprocessor system is left to the system hardware. This invention describes the solution to that task.

Figure 1:
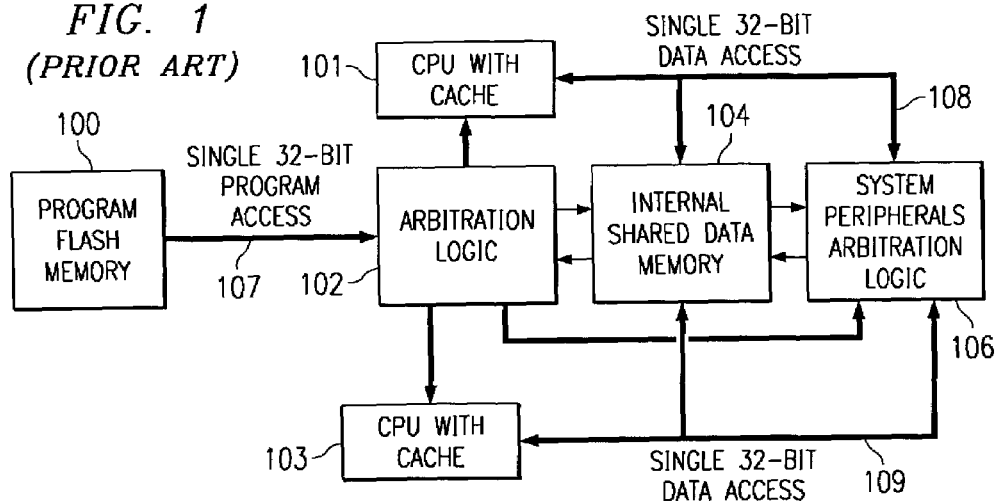
FIG. 1 illustrates an embedded symmetric multiprocessor system of the prior art.

FIG. 1 illustrates a prior art embedded symmetric multiprocessor system (ESMP) architecture. A single flash memory device 100 stores a single program stream. Both central processing units 101 and 103 will receive their instructions from arbitration logic 102. Both central processing units 101 and 103 will receive their data from internal shared data memory 104. When an instruction cache miss occurs, arbitration logic 102 will determine which processor has priority access to the flash memory 100. All system resources are shared and visible to central processing units 101 and 103. Both central processing units 101 and 103 run the same instruction set and have identical organizations.

Similarly, system peripherals and arbitration logic 106 is shared by both central processing units 101 and 103.

To illustrate the need for an atomic read-modify of memory, consider the following. Assume a shared variable lock used to represent the presence of a software lock in a portion of the shared memory that both central processing units are attempting to access. Assume also that central processing unit 101 wins arbitration, and reads the lock. On the following cycle, central processing unit 103 reads the lock. Central processing unit 101 upon reading the lock, determines that the lock was not set, then proceeds to write a set lock command to memory. However, central processing unit 101 may also read the lock as being unset.

In this sequence of events, central processing unit 101 proceeds to perform the task that the lock was intended to protect. However, central processing unit 103 proceeds in like manner, having also found the lock to be unset. Without some form of data synchronization central processing unit 103 will also perform the task that the lock was intended to prevent. This would result in unintended program behavior. Clearly, an atomic read-modify memory operation is needed. Since this atomic read-modify memory operation is not available as a central processing unit instructions, system hardware is required. This invention describes a direct approach toward the solution of this data synchronization difficulty.

Figure 2:
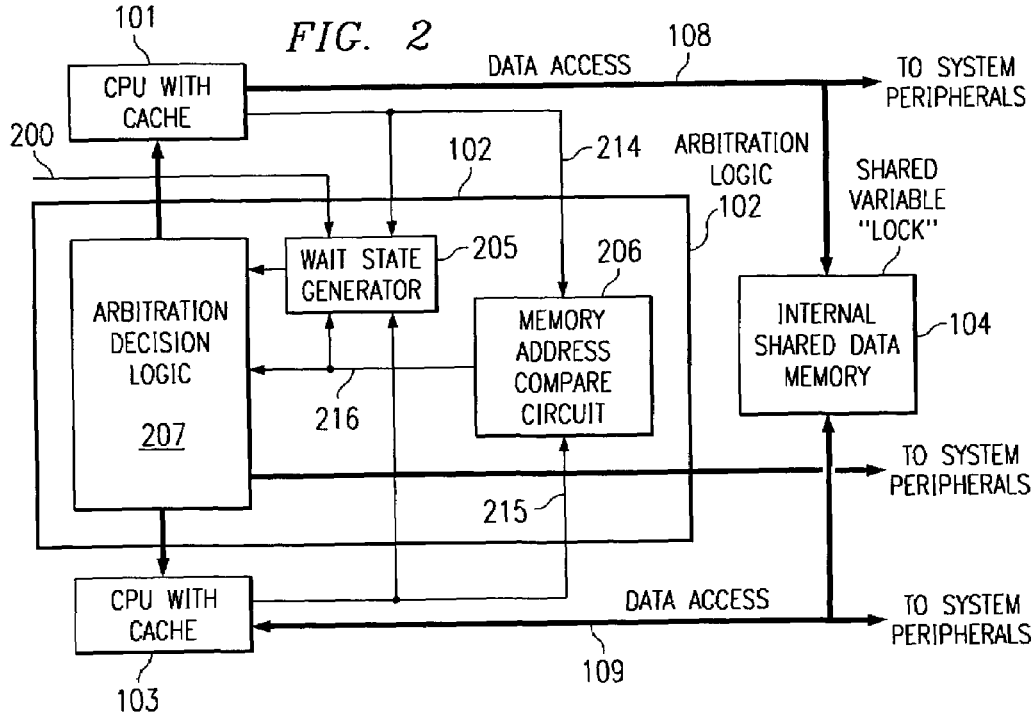
FIG. 2 illustrates the arbitration logic of FIG. 1 in further detail including the memory address compare circuit, and lock check/set/reset signal paths and wait state generator.

FIG. 2 illustrates in additional detail, the arbitration logic 102 of this invention. FIG. 2 illustrates central processing units 101 and 103, internal shared data memory 104 and data busses 108 and 109 as previously illustrated in FIG. 1. FIG. 2 omits program Flash memory 101 and system peripherals arbitration logic 106 for simplicity. These components are connected as illustrated in FIG. 1. Arbitration logic 102 of FIG. 2 controls data accesses by central processing units 101 and 103. If one central processing unit reads a memory location, arbitration logic 102 will not allow another central processing unit to read the same memory location for a given number of cycles. Arbitration logic 102 compares memory access addresses in memory address compare circuit 206. If the two input addresses 214 from central processing unit 101 and 215 from central processing unit 103 are identical, the memory address compare circuit 206 passes signal 216 to arbitration decision logic 207 indicating the match.

The number wait states arbitration decision logic 207 will delay central processing unit access is programmable via input 200. This signal comes from system software to the wait state generator 205 of the arbitration logic 102. This should be the number of cycles for the base central processing unit to read, analyze and then write back the result. The number of wait states is preferably programmed upon system initialization. The boot code can store the appropriate number of wait states for that particular instance of the symmetrical embedded multiprocessor. Alternately, the boot code can cause one central processing unit to perform a read-check-write operation and determine the number of memory cycles required. This measured number of required memory cycles determines the programmed number of wait states. This latter alternative has the benefit of portability. That is, the boot code does not need to be changed for different instances of the symmetrical embedded multiprocessor having different memory timing parameters.

In order to achieve the smallest number of clock cycles for the possible read-modify memory operation, all exceptions to central processing unit are software disabled during this process. That is, there are no interrupts allowed during this time. The operating system low-level routines provide a function called set_lock that will disable all exceptions, read the lock memory value, determine its state, and the set the lock by writing the lock='1' condition into memory. This allows the software to operate without need for interaction by the programmer on behalf of the hardware and relieves a possible burden for the end application programmer. Because most lock setting is done by the code scheduler as part of the operating system, there is no impact on the application-programming task.

Wait-state generator 205 has a set of user programmable control registers that set how many clock cycles to wait. The control registers also take in a decoded address and data so that a central processing unit can write to it. The wait-state feature is user programmable to force arbitration logic 102 to hold a central processing unit in wait for x number of clock cycles when both central processing units try to access the same memory location. Arbitration logic 102 must determine which central processing unit had first access to the memory location. Arbitration logic 102 grants priority to that central processing unit and holds off other central processing units for the programmed number of wait states. Note if another central processing unit attempts to access another address, the wait states are not required.

In an embedded symmetrical multiprocessor system, the memory arbiter determines which processor has access to memory. A memory address compare circuit is included within this arbitration logic that will cause another central processing unit to stall for a programmable number of wait states if the same data location has been read by a different processor. This approach gives the first processor sufficient time to determine the state of the variable and write to memory the intended value in an atomic or non-interruptible fashion. If another central processing unit tries to read the same data location, it will stall until the first central processing unit has enough time to write the correct value has been written back to memory. Since the number of wait states is programmable, the application boot code can determine how long it will take to perform the read-check-write operation, and program that value into the wait-state generator. The arbitration logic will not allow another central processing unit access to that memory location for the programmed number of wait states after being read by the first central processing unit.

System efficiency dictates that the number of cycles be kept to a minimum for a read-check-write operation. A low-level software routine can be created that will specifically perform lock-checking operations, since this is the most common operation performed on a shared variable which by definition is a software lock variable.

Figure 3:
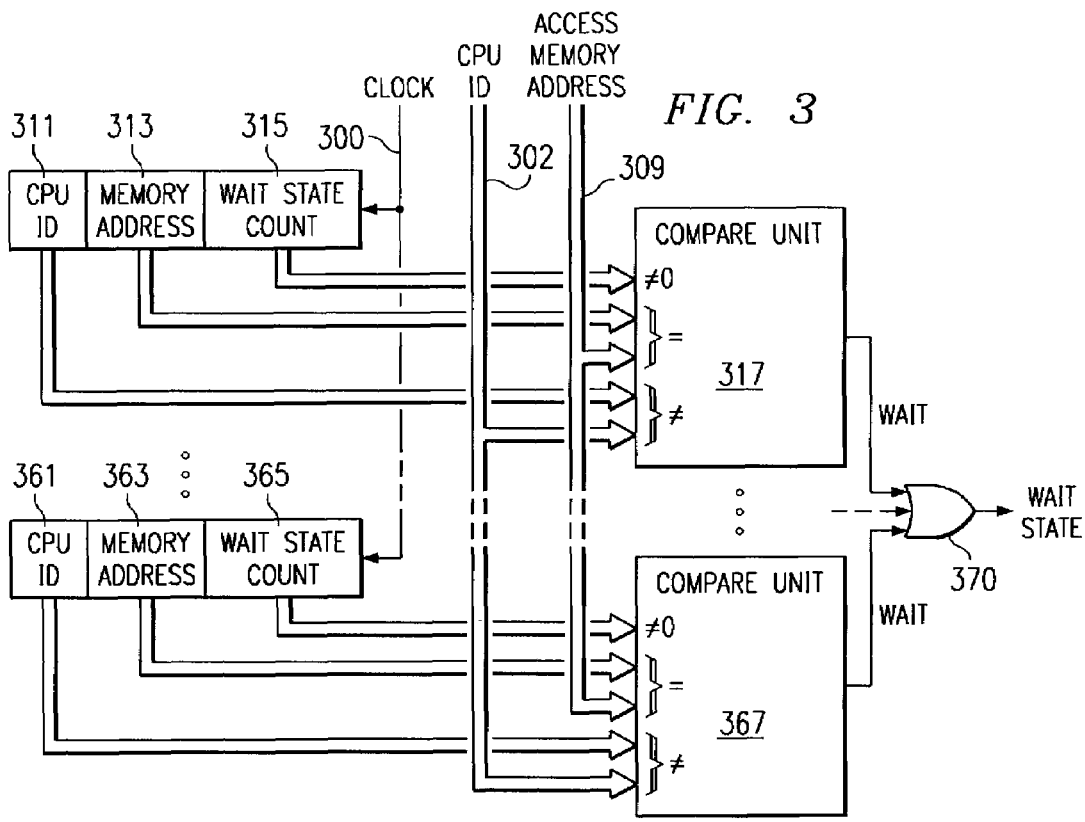
FIG. 3 illustrates the memory address compare circuit of FIG. 1 in further detail.

FIG. 3 illustrates an example embodiment of memory address compare unit 206 illustrated in FIG. 2. The combination of central processing unit identity register 311, memory address register 313 and wait state count 315 is initialized upon grant of memory access by arbitration logic 102 that is given a wait state. Central processing unit identity register 311 stores data indicative of the central processing unit granted access. Each central processing unit within the symmetrical multiprocessor system is assigned a unique identity number. This identity number is stored in central processing unit identity register 311. The memory address of the access request is stored in memory address register 313. Upon grant of access the number of wait states programmed within wait state generators 205 is stored in wait state count register 315. Wait state count register 315 receives system clock 300. Wait state count register 315 decrements once each clock signal until it reaches zero.

Arbitration logic 102 arbitrates between central processing unit competing for access to internal shared memory 104. Arbitration logic 102 selected one such central processing unit each memory cycle. The central processing unit identity 302 and the access memory address 304 of this selected central processing unit are supplied to memory address compare circuit 206 for determination whether a wait state is required. Both central processing unit identity 302 and access memory address 304 are supplied to compare unit 317. Compare unit 317 also receives data from central processing unit identity register 311, memory address register 313 and wait state count register 315. Compare unit 317 produces a wait output signal if: wait state count 315 is non-zero; access memory address 304 matches memory address 313; and central processing unit identity 302 does not match central processing unit identity 311.

FIG. 3 includes central processing unit identity register 361, memory address register 363, wait state count register 365 similarly connected to compare unit 367. These parts operate as described above with regard to central processing unit identity register 311, memory address register 313, wait state count register 315 and compare unit 317. Central processing unit identity 302 and access memory address 304 are supplied to compare unit 367. Compare unit 367 produces a wait output signal if: wait state count 365 is non-zero; access memory address 304 matches memory address 363; and central processing unit identity 302 does not match central processing unit identity 361. Those skilled in the art would realize that there could be more than two of the combinations of registers and compare units. The wait signal of each compare unit is supplied to OR gate 370. If any compare unit produces a wait signal, then OR gate 370 produces a wait state. As previously described, this wait state causes the requesting central processing unit to delay before accessing internal shared data memory 104.

The example embodiment illustrated in FIG. 3 enables the use of fewer register/compare unit combinations than allocation of one combination to each central processing unit. Any such register/compare unit combination where the wait state count is zero may be reallocated to another central processing unit by storing the corresponding central processing unit identity, memory address and wait state count. When the wait state count decrements to zero, the need for blocking other central processing unit access to that address has expired. The number of register/compare unit combinations provided should be selected with regard to the expected maximum number of central processing unit which will access internal shared memory 104 at the same time. Note that this system blocks all access to the same memory address, not just access to a lock variables. On the other hand, more than one central processing unit should not be heavily accessing the same section of memory at the same time.

The example embodiment of FIG. 3 could be altered to provide one combination memory address register 313/363 and wait state count register 315/365 for each central processing unit. No central processing unit identity register would be needed. Instead the compare units 317/367 would hard code the corresponding central processing unit identity. In other respects this alternative embodiment would operate as described above regarding FIG. 3.

Figure 4:
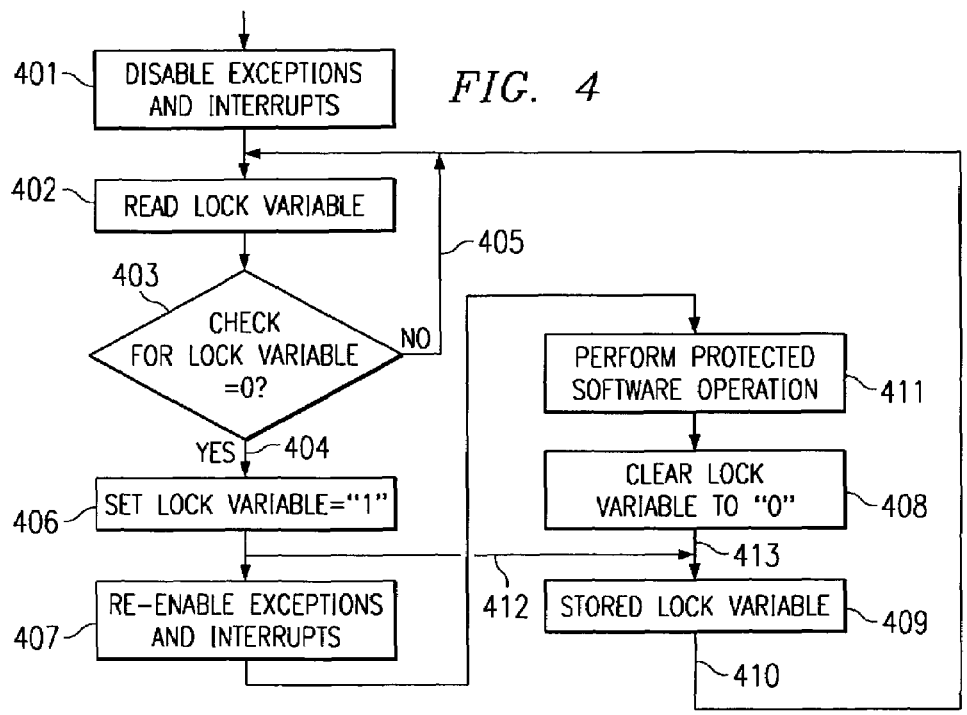
FIG. 4 illustrates the flow diagram for the data synchronization method of the invention.

FIG. 4 illustrates a flow chart of the steps required in the accompanying software routine. The software first disables all exceptions and interrupts (processing block 401). The disabling of exceptions in processing block 401 is required because the number of wait-states to perform the read-check-set operation must not be variable. The hardware illustrated in FIG. 2 issues wait states to another central processing unit attempting to access the lock variable during this interval. Permitting interrupts or exceptions would leave open the possibility that insufficient wait states may be generated to complete the read-check-set operation before another central processing unit may access the lock variable.

The software next reads the memory lock variable logic state (processing block 402). FIG. 4 illustrates stored lock variable 409 reporting its state via line 410. The software then checks to determine if the lock variable is set to '0' (decision block 403). If the lock variable is not already set to a logical '1' (Yes at decision block 403), then the software sets the lock variable to a logical '1' (processing block 406). FIG. 4 illustrates this via set signal 412 to stored lock variable 409. The software then re-enables exceptions and interrupts (processing block 407) and performs the protected software operation (processing block 411). If another central processing unit checks the lock variable during this interval, this other central processing unit will read the lock variable as '1' (no at decision block 403) indicating that the operation is protected.

Upon completion of the protected operation (processing block 411), the software clears the lock variable to zero (processing block 408). FIG. 4 illustrates this via clear signal 413 to stored lock variable 409.

While FIG. 4 illustrates the software process that handles the check lock function, this process does not directly relate to the hardware of FIG. 2. However, consideration of the software process provides a more clear understanding of the task performed by the hardware described in the invention.

In summary, the hardware must make sure that, while one central processing unit is reading the lock variable, another central processing unit is not reading or changing the lock at the same time. Multiple central processing unit cycles are required to determine what the value of a memory location is have to do a logical AND, OR and based on that result, write a lock='1' back to memory. Otherwise, before that lock='1' is written, another central processing unit could have read the lock state. The hardware prevents this by forcing a stall, that is, it asserts wait-states on any attempt to read the same memory location.

The two major advantages of the present invention are:

1. Existing central processing units can be used as the base central processing unit for an embedded symmetrical multiprocessor system without change and with no special instructions required. This allows the symmetrical multiprocessor system to behave the same as a single processor system with regard to application execution.

2. Once designed, the same system hardware can be applied in all symmetrical multiprocessor systems, independent of the base central processing unit used. No changes are required to the base central processing unit, or to the symmetrical multiprocessor system hardware when changing base central processing units.

What is claimed is:

1. A data synchronization system in a multiprocessing system including plural central processor units, shared data memory and memory arbitration logic that arbitrates central processor unit access to shared data memory, the improvement comprising:

upon granting one central processor unit memory access to a memory address within the shared data memory, the memory arbitration logic subjects other central processor units to a predetermined number of wait states upon attempt to access said memory address within the shared data memory; and upon granting one central processor unit memory access, the memory arbitration logic does not subject other central processor units to said predetermined number of wait states upon attempt to access another memory address within the shared data memory.

2. The data synchronization system of claim 1, wherein: the predetermined number of wait states is programmable.

3. The data synchronization system of claim 1, wherein: the predetermined number of wait states is programmable upon system initialization.

4. The data synchronization system of claim 3, wherein: program initialization code run upon each initialization of
the multiprocessing system causes a selected central processing unit to
perform a read-check-write operation to a predetermined memory address of the shared data memory,
determine a number of memory cycles required to complete said read-check-write operation, and
store a number of wait states in a wait state generator at least as great as said determined number of memory cycles to complete said read-check-write operation.

5. The data synchronization system of claim 1, wherein: the shared data memory has at least one lockable section with a lock variable having an unlock state permitting read and write access to said lockable section and a lock state permitting read access to said lockable section and prohibiting write access to said lockable section.

6. The data synchronization system of claim 5, wherein: said predetermined number of wait states is selected to be
long enough for a central processor unit to read said lock variable, determine whether said lock variable has an unlock state or a lock state and change said lock variable from said unlock state to said lock state.

7. The data synchronization system of claim 1, wherein: said memory arbitration logic includes
a memory address register storing a memory address,
an address compare unit coupled to said memory address register for comparing an access address from a central processing unit to said memory address stored in said memory address register, and
a wait state generator for storing said predetermined number of wait states,
wherein said memory arbitration logic is operable upon grant of access to a central processing unit of the shared data memory to
store an access address of the granted access of the central processing unit of the shared data memory in said memory address register,
trigger said wait state generator to generate said predetermined number of wait states,
compare via said address compare unit an access address from another central processing unit to said memory address stored in said memory address register, and
defer grant of access to said other central processing unit until expiration of said predetermined number of wait states if said access address of said other central processing unit matches said memory address stored in said memory address register.

8. The data synchronization system of claim 1, wherein: said memory arbitration logic includes
a central processing unit identity register storing a central processing unit identity,
a memory address register storing a memory address,
a wait count register receiving a clock signal, said wait count register storing a wait count and decrementing said wait count once each clock signal,
a compare unit coupled to said central processing unit identity register, said memory address register and said wait state count register, said compare unit generating a wait signal if: (1) said wait state count is non-zero, (2) an access memory address of access requesting central processing unit matches said memory address stored in said memory address register, and (3) said access requesting central processing unit does not match the central processing unit identity store in said central processing unit identity register, and
a wait state generator for storing said predetermined number of wait states,
wherein said memory arbitration logic is operable upon grant of access to a central processing unit of the shared data memory to
store a corresponding central processing unit identity in said central processing unit identity register,
store an access address of the granted access of the central processing unit of the shared data memory in said memory address register,
store said predetermined number of wait states in said wait state count register, and
defer grant of access to said access requesting central processing unit if said compare unit generates said wait signal.

9. The data synchronization system of claim 1, wherein: said memory arbitration logic includes
a plurality of register/compare units, each including
a central processing unit identity register storing a central processing unit identity,
a memory address register storing a memory address,
a wait count register receiving a clock signal, said wait count register storing a wait count and decrementing said wait count once each clock signal,
a compare unit coupled to said central processing unit identity register, said memory address register and said wait state count register, said compare unit generating a wait signal if: (1) said wait state count is non-zero, (2) an access memory address of access requesting central processing unit matches said memory address stored in said memory address register, and (3) said access requesting central processing unit does not match the central processing unit identity store in said central processing unit identity register,
an OR gate receiving said wait signals from each compare unit and generating a wait state signal if any compare unit generates a wait signal, and
a wait state generator for storing said predetermined number of wait states,
wherein said memory arbitration logic is operable upon grant of access to a central processing unit of the shared data memory to
store a corresponding central processing unit identity in said central processing unit identity register, store a an access address of the granted access of the central processing unit of the shared data memory in said memory address register, and store said predetermined number of wait states in said wait state count register of a register/compare unit having zero stored in its wait state count register, and
defer grant of access to said access requesting central processing unit if said OR gate generates said wait state signal.

10. A method of data synchronization in a multiprocessing system including plural central processor units, shared data memory and memory arbitration logic that arbitrates central processor unit access to shared data memory, the method comprising the steps of:

upon granting one central processor unit memory access to a memory address within the shared data memory, storing the memory address;

comparing an access memory address of another central processing unit to said stored memory address;

stalling the other central processor units a predetermined number of wait states upon a match of said access memory address and said stored memory address; and not stalling the other central processor units to said predetermined number of wait states upon a non-match of said access memory address and said stored memory address.

11. The method of data synchronization of claim 10, wherein:

the predetermined number of wait states is programmable.

12. The method of data synchronization of claim 10, wherein:

the predetermined number of wait states is programmable upon system initialization.

13. The method of data synchronization of claim 12, wherein:

upon each multiprocessing system initialization
performing a read-check-write operation to a predetermined memory address of the shared data memory,
determining a number of memory cycles required to complete said read-check-write operation, and
programming said predetermined number of wait states at least as great as said determined number of memory cycles to complete said read-check-write operation.

14. The data synchronization system of claim 10, wherein:

the shared data memory has at least one lockable section with a lock variable having an unlock state and a lock state;

said method further comprises the steps of:

permitting read and write access to said lockable section if said lock variable has said unlock state; and permitting read access to said lockable section and prohibiting write access to said lockable section if said lock variable has said lock state.

15. The data synchronization system of claim 14, wherein:

said step of programming said predetermined number of wait states selects said predetermined number of wait states to be long enough for a central processor unit to read said lock variable, determine whether said lock variable has an unlock state or a lock state and change said lock variable from said unlock state to said lock state.

16. The data synchronization system of claim 10, further comprising the steps of:

storing an access address of the granted access of the central processing unit of the shared data memory in a memory address register comparing an access address from another central processing unit to said memory address stored in said memory address register; and deferring grant of access to said other central processing unit until expiration of said predetermined number of wait states if said access address of said other central processing unit matches said memory address stored in said memory address register.

* * * * *